(12) United States Patent
Johnson et al.

(10) Patent No.: US 8,894,739 B1
(45) Date of Patent: Nov. 25, 2014

(54) METAL POWDERS WITH IMPROVED FLOWABILITY

(75) Inventors: Curtis E. Johnson, Ridgecrest, CA (US); Kelvin T. Higa, Ridgecrest, CA (US); Roger M. Sullivan, Raleigh, NC (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 173 days.

(21) Appl. No.: 12/890,440

(22) Filed: Sep. 24, 2010

Related U.S. Application Data

(63) Continuation-in-part of application No. 11/752,677, filed on May 23, 2007, now Pat. No. 7,943,084.

(51) Int. Cl.
*B22F 1/02* (2006.01)

(52) U.S. Cl.
USPC .............................................. 75/255; 428/405

(58) Field of Classification Search
USPC ....... 75/255; 419/31; 148/513; 428/570, 404, 428/405
See application file for complete search history.

(56) References Cited

U.S. PATENT DOCUMENTS

| | | |
|---|---|---|
| 2,917,406 A | 12/1959 | McBride |
| 3,873,337 A | 3/1975 | Laufer et al. |
| 4,051,228 A | 9/1977 | Knorre et al. |
| 4,107,274 A | 8/1978 | Knorre et al. |
| 5,307,127 A | 4/1994 | Kobayashi et al. |
| 5,445,886 A * | 8/1995 | Ogawa .......................... 428/403 |
| 5,547,796 A | 8/1996 | Kohtaki et al. |
| 5,989,304 A | 11/1999 | Ozaki et al. |
| 6,207,101 B1 | 3/2001 | Beall et al. |
| 6,224,980 B1 | 5/2001 | Komai et al. |
| 6,503,445 B2 | 1/2003 | Ozaki et al. |
| 6,558,488 B2 * | 5/2003 | Wanninger et al. .......... 149/19.1 |
| 7,419,527 B2 * | 9/2008 | Gwozdz et al. ................. 75/252 |
| 2002/0128336 A1 | 9/2002 | Kolb et al. |
| 2003/0077448 A1 | 4/2003 | Ueta et al. |
| 2004/0009340 A1 | 1/2004 | Zhu et al. |
| 2008/0152909 A1* | 6/2008 | Kyotani et al. ............... 428/402 |

OTHER PUBLICATIONS

Johnson, C. E.; Harris, D. C.; Nelson, J. G.; Kline, C. F,; Corley, B. L. "Strengthening of Glass and Pyroceram with Hydrophobic Coatings" NAWCWD TP 8536, Apr. 2003.

* cited by examiner

*Primary Examiner* — George Wyszomierski
*Assistant Examiner* — Ngoclan T Mai
(74) *Attorney, Agent, or Firm* — Charlene A. Haley

(57) ABSTRACT

A process to increase the fluidity of metal powders by surface modification with alkylsilane reagents. This invention generally discloses that the most efficient process results from treatment with methyltrichlorosilane in hexane. In particular, the fluidity of aluminum powders having mean diameters smaller than 10 micrometers was considerably improved by the process of embodiments of the invention.

16 Claims, 8 Drawing Sheets

METAL POWDERS WITH IMPROVED FLOWABILITY

CROSS-REFERENCE TO RELATED APPLICATIONS

This is a continuation-in-part application, claiming the benefit of, parent application Ser. No. 11/752,677 filed on May 23, 2007 now U.S. Pat. No. 7,943,084, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to the surface treatment of metal powders with a chlorosilane compound to improve the flow characteristics and packing density of the powders.

BACKGROUND OF THE INVENTION

Flowability is an important characteristic for all types of powders in industrial processes, including, for example: the manufacture of pharmaceuticals; powder metallurgy; the powder injection molding (PIM) of metal, ceramic and/or composite powders; the formulation of energetic materials; and other processes and applications involving the flow, mixing, dispersion, or fluidization behavior of powders. Flowability is often characterized by the flow rate of a specific mass or volume of powder that passes through a funnel with specified cone angle and aperture [Wanibe, Y.; Itoh, T. *New Quantitative Approach to Powder Technology*; J. Wiley: New York, 1998, Ch. 10]. A related method is to vary the size of a funnel aperture to determine the minimum diameter through which the powder will freely flow [a) Taylor, M. K.; Ginsburg, J.; Hickey, A. J.; Gheyas, F. "Composite method to quantify powder flow as a screening method in early tablet or capsule formulation development." *AAPS PharmSciTech*, 2000, 1(3) article 18. [http://www.aapspharmscitech.org/pt0103/pt010318/pt010318.pdf last accessed Feb. 2, 2004. b) Gioia, Alberto "Intrinsic flowability: a new technology for powder-flowability classification." John Morris Scientific. http://203.147.186.54/html/Hanson/flodex_report.htm last accessed Feb. 9, 2004]. Another dynamic approach is to put a powder sample in a drum that rotates at a constant rate and measure the frequency with which the powder avalanches down the side of the drum ["Aero-Flow Powder Flowability Analyzer Model 3250" TSI Incorporated http://www.tsi.com/powder/products/3250/3250.htm last accessed Feb. 2, 2004].

A static parameter known to correlate with flowability is the angle of repose of a powder pile, which reflects whether the particles cling together to form a steep pile or slide off one another to form a low mound [Bose, A. *Advances in Particulate Materials*; Butterworth-Heinemann: Boston, 1995, 300-302]. Typically, the angle of repose parameter is measured by allowing powder to flow freely through a funnel onto a flat surface to form a pile. The angle between the flat surface and slope of the pile is the angle of repose. Dynamic tests of powder flowability may use specialized equipment, such as a computer controlled Jenike shear cell [Puri, V. M.; Ladipo, D. D. U.S. Pat. No. 6,003,382, Dec. 21, 1999.], and may require samples on the order of 100's of grams. By contrast, the angle of repose measurement requires no specialized equipment and can be adapted to a scale utilizing only a few grams of powder. While both angle of repose and shear flow tests generally differentiate powders based on their flow characteristics, the exact correlation between the tests is not known.

The flowability, or fluidity, of a powder depends on many factors. For example, Table 1 (taken from Rimai, D. "Particle-Substrate Interactions: Microscopic Aspects of Adhesion" NexPress Solutions LLC. Rochester N.Y.) lists both sample dependent and condition dependent factors.

TABLE 1

Variables that affect powder flow. ("The Nature of Powders" http://www.freemantech.co.uk/pages/natofpow/nature-powders.html last accessed Feb. 2, 2004)

| Powder or Particle Variables | External Factors Influencing Powder Behavior |
|---|---|
| Particle size | Flow rate |
| Size distribution | Compaction condition |
| Shape | Vibration |
| Surface texture | Temperature |
| Cohesivity | Humidity |
| Surface coating | Electrostatic charge |
| Particle interaction | Aeration |
| Wear or attrition characteristics | Transportation experience |
| Propensity to electrostatic charge | Container surface effects |
| Hardness | Storage time |
| Stiffness | |
| Strength | |
| Fracture toughness | |

At a microscopic level, the theory of powder flow is based on theories about adhesion, with the dominant theory being that of Johnson, Kendall, and Roberts (JKR) [Johnson, K. L.; Kendall, K.; Roberts, A. D. *Proc. R. Soc. London: Part A*, 1971, 324, 301]. Basic assumptions of the theory include: (1) elastic deformation of spherical particles that vary the contact region, (2) a small contact radius compared to the particle radius, (3) only local interactions in the region of contact are considered—no long range forces are considered to act on the particles [Rimai, D. "Particle-Substrate Interactions: Microscopic Aspects of Adhesion" NexPress Solutions LLC. Rochester N.Y., http://www.clarkson.edu/projects/fluidflow/courses/me537/Rimai__1.pdf last accessed Feb. 2, 2004]. The JKR theory has been applied to the study of contact surfaces between alkylsilane-coated aluminum and polymers (motivated by the importance of adhesion in the performance of composite materials) [Emerson, J. A.; Giunta, R. K.; Miller, G. V.; Sorensen, C. R.; Pearson, R. A. "The effect of surface contamination on cohesive forces as measured by contact mechanics." *Mat. Res. Symp.* 2000, 629, 871-876.].

The cohesive force acting between two polymer surfaces is described as dispersive (non-polar, hydrophobic interactions). In contrast, for metal powders such as aluminum the cohesive forces are predominantly polar. The polar forces arise from hydroxyl group surface termination and physisorbed water molecules on the metal oxide layer that covers most metal surfaces (similar in nature to the well known hydrogen bond formation in molecular chemistry). A realized object of the present invention is to reduce the polar cohesion between metal powder particles by replacing surface hydroxyl groups with hydrophobic alkylsilanes. The prospect of using a hydrophobic surface-modifying agent to improve flow has been broached in a number of patents that describe the use of substituted chlorosilanes and substituted alkoxysilanes [a) Yukiko Ozaki, Satoshi Uenosono, Kuniaki Ogura, Iron-based powder composition for powder metallurgy having higher flowability and higher compactibility and process for production thereof, U.S. Pat. No. 6,503,445, issued Jan. 7, 2003. b) Yukiko Ozaki, Satoshi Uenosono, Kuniaki Ogura, Iron-based powder composition for powder metallurgy excellent in flowability and compactibility and method, U.S. Pat. No. 5,989,304, issued Nov. 23, 1999. c) Takaaki Kohtaki, Masaaki Taya, Masami Fujimoto, Developer containing insulating magnetic toner flowability-improving agent and inorganic fine powder, U.S. Pat. No. 5,547,796, issued Aug. 20, 1996. d) Tetsuya Kobayashi, Haruo Fujii, Motoi Katoh, (Yokohama, JP), Tatsuya Kobayashi, Toshiaki Miyashiro, Naoki Enomoto, Akihiko Uchiyama, Yoshiro Saito, Developing apparatus using one component toner with improved flowability, U.S. Pat. No. 5,307,127, issued Apr. 26, 1994. e) Helmut Knorre, Joachim Fischer, Gerhard Pohl, Process for preventing caking and obtaining flowability of alkali chlorides and salt mixtures thereof; U.S. Pat. No. 4,107,274, issued Aug. 15, 1978. f) Helmut Knorre, Joachim Fischer, Gerhard Pohl, Preventing caking and obtaining flowability of alkali chlorides and salt mixtures thereof, U.S. Pat. No. 4,051,228, issued Sep. 27, 1977.]

In the direct reaction of chlorosilanes with hydroxy terminated metal surfaces, the expected products are the tethered or surface bound silanes and HCl. In the literature on modifying aluminum surfaces with alkylsilanes, frequent use is made of the condensation reaction of a silanol with a surface hydroxyl group to eliminate water and form a Si—O—Al linkage. The silanols are usually generated by hydrolysis of either chlorosilanes or alkoxysilanes. Volatile dialkyldichlorosilanes have been applied to metal oxide powders using a gas/solid reaction [Siegmar Laufer, Waldemar Roy, Process for the hydrophobization of higher dispersed oxides, U.S. Pat. No. 3,873,337, issued Mar. 25, 1975]. Much of the work in the literature is directed to improving the bonding between aluminum and epoxies or polymers [a) Zhang M. C.; Kang E. T.; Neoh K. G.; Tan K. L "Surface modification of aluminum foil and PTFE film by graft polymerization for adhesion enhancement" Colloids and Surfaces A: Physicochemical and Engineering Aspects, 2001, 176(2), 139-150. b) Abel, M-L; Rattana, A.; Watts, J. F. "Interaction of Epoxy Analogue Molecules with Organosilane-Treated Aluminum: A Study by XPS and ToF-SIMS" *Langmuir,* 2000 16(16), 6510-6518. c) Lee, I.; Wool, R. P. *Thin Solid Films* 2000, 379(1-2), 94-100.] and [Underhill, P. R.; DuQuesnay, D. L. "The reaction of water with abraded aluminum surfaces as studied by Fourier transform infrared spectroscopy" *App. Surf. Sci.* 1999, 141, 138-140]. Some pretreatments are reported to increase the number of surface hydroxyl groups available to react with the surface modifying silane [a) Kabayashi, G. S.; Donnelly, D. J. Boeing Co Report No. DG-41517, 1974. b) Boeing Process Specification BAC 5810, February 1991]. Other pretreatments create Lewis acid sites on the alumina-like surface of the aluminum metal to increase the binding strength of surface modifying reagent [Puri, V. M.; Ladipo, D. D. U.S. Pat. No. 6,003,382, Dec. 21, 1999]. In addition to alkoxy- and chlorosilanes, other surface modifiers have been tried, such as acid anhydrides [Schultz, J.; Lavielle, L.; Cane, A.; Comien, P., *J. Mater. Sci.* 1989, 24, 4363]. However, the prior art does not disclose or suggest the direct reaction of chlorosilanes with hydroxy terminated metal oxide surfaces to improve the flow characteristics of metal powders such as aluminum, magnesium, titanium, aluminum-magnesium powders, and the like.

SUMMARY OF THE INVENTION

The embodiments of the invention generally relates to metal powders with improved flowability. A significant improvement in the flow behavior of reactive metal powders obtained by surface modification with alkylsilane reagents. The powders treated by this process become hydrophobic and are not readily wetted by water. Dramatically improved flow characteristics of the treated powders are demonstrated by lower angle of repose, higher pour density, higher packing density, and shorter times required for sieving. For example, the improvement in powder flow behavior was demonstrated by angle of repose measurements, which showed up to a 30° reduction for the treated powders. An embodiment, the chlorosilane compound is diluted with a hydrocarbon solvent to facilitate efficient mixing with the metal powder. After mixing, the solvent and unreacted chlorosilane compound are separated from the metal powder by distillation or filtration. After drying, the treated metal powder may be sieved to remove small amounts of clumped material. Chemical analysis of the treated powders shows that small amounts (<0.05%) of silicon and chlorine are incorporated. In an alternative embodiment, a vapor phase treatment using a chlorosilane compound without a solvent may be used.

The process disclosed herein was readily scaled to 105-pound batches with a moderately high throughput. Further scale-up requires only larger scale equipment. Silane treated aluminum powders with nominal sizes of about 5-10 microns exhibited improved flow behavior, with higher solids loading under pressurized delivery and higher packing density.

Among a wide variety of chlorosilane reagents examined, the most effective to improve the flow characteristics of metal powders were trichlorosilanes with short-chain alkyl groups (e.g., methyl, isobutyl, tertiary butyl, and the like). Silanes with long-chain alkyl groups or only one chloro substituent were generally much less effective in altering the flow characteristics of metal powders. Accordingly, the trichlorosilanes with short-chain alkyl groups are the preferred surface modifying reagents. Repeated treatment of metal powders with silane compounds results in only slight additional improvement in flow characteristics. Gravimetric and Fourier Transform Infrared (FTIR) analysis indicate that only a small amount, estimated to be 0.1 weight percent or less, of a silane compound is incorporated in a treated powder. Thus, the improvement in powder flow characteristics provided by the present invention most likely results from a surface modification of the particle metal oxide layer in which interparticle hydrogen bonding interactions have been reduced by reaction of the chlorosilanes with the surface oxide layer hydroxyl groups. As the trichlorosilanes are most effective surface modifying reagents, binding of the silane to the particle surface at multiple sites may be an important factor in the improved flow behavior observed. Furthermore, tests on the effect of storage under high humidity show that the silane treated metal powders are less susceptible to degradation, as evidenced by clumping, than are untreated powders.

The improvement in metal powder flowability provided by embodiments of the invention has the potential for direct application to many processes and applications involving the flow or mixing behavior of metal powders, such as the manufacture of pharmaceuticals and lubricants, powder metallurgy, the powder injection molding (PIM) of metal, ceramic and/or composite powders, powder coating, composite material formulation and formulation of energetic materials. [a) Kubota, N. *Thermochemical Aspects of Combustion*; Wiley-VCH: New York, 2002, p. 76. b) Johnson, C.; Parr, T.; Hanson-Parr, D.; Hollins, R.; Fallis, S.; Higa, K. "Combustion and Oxidation of Metal Nanoparticles and Composite Particles" JANNAF 37$^{th}$ Combustion Subcommittee Meeting, Vol. 1. CPIA, November 2000, pp. 539-551.] Due to enhanced aerosol formation, the metal powders provided by the invention may also be useful in fluidization processes and certain combustion applications, including the combustion synthesis of metal oxide powders. The term "fluidizability" as used herein shall mean the ease with which a powder may be made more fluid. It is known to those of ordinary skill in the art of the subject invention that a powder may be fluidized, such as in a fluidized bed or aerosol, for example. The improved dispersion properties of micron-sized or nano-sized powders provided by the present invention may render them useful in inkjet printing applications.

Our work with hydrophobic coatings on glass suggested to us that alkyl and perfluoroalkyl chlorosilanes would be good candidates for investigation as metal particle surface modifying agents [Johnson, C. E.; Harris, D. C.; Nelson, J. G.; Kline, C. F.; Corley, B. L. "Strengthening of Glass and Pyroceram with Hydrophobic Coatings" NAWCWD TP 8536, April 2003]. Because the chlorosilanes cannot undergo auto-condensation reactions, they are more stable than silanols. Such stability is an important consideration with regard to shipping and storage. In dry solvents, the chlorosilanes react directly with hydroxyl terminated metal oxide surfaces to form the Si—O—Al linkage and HCl, or react with physisorbed water to form the silanol which can undergo either auto-condensation to form oligomers, or condensation with the hydroxyl terminated surface to form more linkages. In wet solvents, a greater amount of oligomerization is to be expected. The number of potential bonds or linkages to stabilize the alkylsilane on the metal oxide surface increases proceeding from mono- to di- to trichloro alkylsilanes. For monochloro alkylsilanes auto-condensation yields only unreactive dimers, but the di- and trichloro alkylsilanes can form more complex siloxane chains and three dimensional siloxane nets, which can have multiple bonds or linkages to the metal oxide surface. In wet solvents, the di- and trichloro alkylsilanes could possibly form particles of the bulk siloxane [Rochow, E. G.; Gilliam, W. F "Polymeric Methyl Silicon Oxides" *J. Am. Chem. Soc.* 1941, 63, 798-800].

Advances made in understanding how changing the surface modifying agent, solvent and metal powder affect the flowability of metal powders are disclosed herein in connection with the process of the invention. The metal powders examined in connection with the invention include aluminum powder (ranging in size from a nominal 2 microns to a nominal 10 microns in diameter), magnesium powder, magnesium-aluminum alloy, and titanium powders. It will be understood by one of ordinary skill in the art of the invention that powders of other sized particles and of other metals and materials having hydroxyl terminated surfaces may be successfully treated by the process of the invention and are within the scope of the invention. Alkylchlorosilanes, including methyltrichlorosilane, are used as particle surface modifying reagents. It is another realized object of the invention to provide a simple, reliable and inexpensive process that is amenable to a high throughput scale-up, to handle powder lots on a scale of tens to hundreds of pounds, utilizing readily available reagents and equipment to provide significantly improved metal powder flow characteristics.

As used herein, the terms "tethered", "linkage", "linked", "bound", "binding", "bond" and "bonded" shall be understood to refer to an organic substituent, including those shown in FIG. 1 as well as isobutyltrichlorosilane, propyltrichlorosilane, and octadecyltrichlorosilane, covalently bonded directly to an atom residing in the surface of a metal or covalently bonded to an oxygen atom that is covalently bonded directly to an atom residing in the surface of a metal. The terms "surface modifying reagent" and "surface-modifying agent" shall be understood to refer to compounds, in addition to isobutyltrichlorosilane, propyltrichlorosilane, octadecyltrichlorosilane and those identified in Diagram 1, that will react with terminal hydroxyl groups on the surface of a metal to form a metal-oxygen-R linkage, where R is a portion of an aforesaid reagent. The term "metal powder" shall be understood to refer to a powder comprised of particles of aluminum, magnesium, aluminum-magnesium alloy or titanium, or a combination thereof, having terminal hydroxyl groups residing in the metal oxide surface of the particles. The term "treated metal powder" shall be understood to refer to a powder comprised of particles of aluminum, magnesium, aluminum-magnesium alloy or titanium, or a combination thereof, to the surface of each such particle is covalently bonded—either directly to an atom residing in the surface of a metal or covalently bonded to an oxygen atom that is covalently bonded directly to an atom residing in the surface of a metal—a silicon atom of methyltrichlorosilane, (3,3,3-trifluoropropyl)dichloromethylsilane, dichlorodimethylsilane, chlorotrimethylsilane, tert-butyltrichlorosilane, tert-butyl(chloro)dimethylsilane, isobutyltrichlorosilane, propyltrichlorosilane, trichloro(3,3,3-trifluoropropyl)silane, octadecyltrichlorosilane, n-octadecyldimethylchlorosilane, (tridecafluoro-1,1,2,2-tetrahydrooctyl)methyldichlorosilane, oligomerized dialkyldichlorosilane, or oligomerized dichloro di(perfluoroalkyl) silane.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments which are illustrated schematically in the accompanying drawings and in the appended claims.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Description of Metal Powder and Coating Reagents

Aluminum powders were produced by Valimet, Inc. The nominal diameters of the aluminum particles are: 10 micron (H-10 Al); 5 micron (H-5 Al); 3 micron (H-3 Al); and, 2 micron (H-2 Al). Alloy powders were also purchased from Valimet: Al/Mg 50:50 (−270 mesh) and Al/Mg 70:30 (−325 mesh). Magnesium and titanium powders, both −325 mesh, were purchased from Alfa-Aesar. The sample of −200 mesh Mg powder was produced by Hart Metals, Inc.

The silane-based hydrophobic reagents n-octadecyldimethylchlorosilane, (tridecafluoro-1,1,2,2-tetrahydrooctyl) methyldichlorosilane, Aquaphobe CM® (oligomerized dialkyldichlorosilanes), and Aquaphobe CF® (a mixture of oligomerized dichloro di(perfluoroalkyl) silanes) were purchased from Gelest Inc. Silanes purchased from Sigma-Aldrich are octadecyltrichlorosilane, chlorotrimethylsilane, methyltrichlorosilane, tert-butyltrichlorosilane, tert-butyl (chloro)dimethylsilane, isobutyltrichlorosilane, propyltrichlorosilane, trichloro(3,3,3-trifluoropropyl)silane, octadecyltrichlorosilane, and hexamethyldisilazane ((CH$_3$)$_3$SiNHSi(CH$_3$)$_3$). In addition, (3,3,3-trifluoropropyl) dichloromethylsilane was purchased from Oakwood and dichlorodimethylsilane from Supelco. Trifluoroacetic anhydride was purchased from Sigma-Aldrich. All reagents were used as received. Solvents (typically 99.9% anhydrous grade) were used as received from Sigma-Aldrich.

Figure 2:
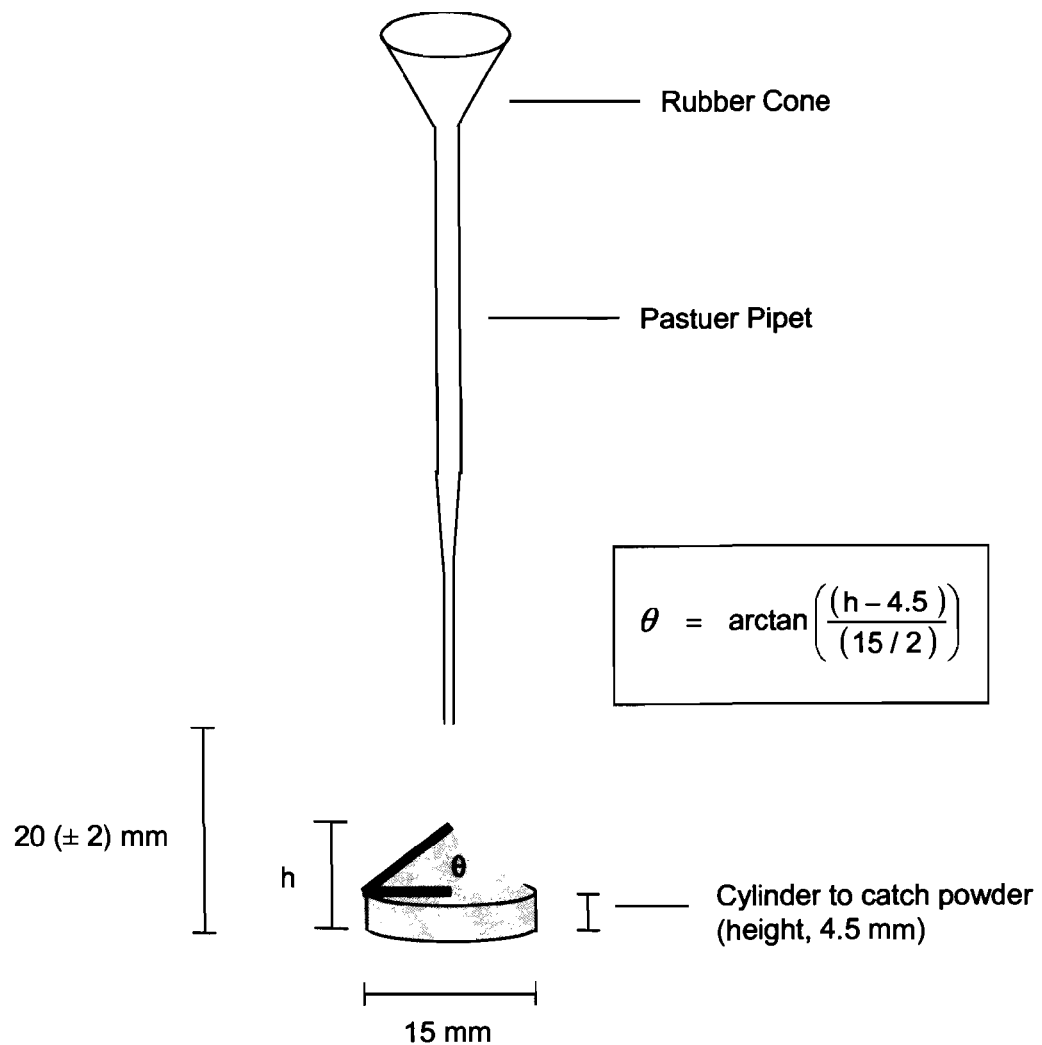
FIG. 2 of the drawings is an experimental setup for determining the angle of repose, θ, by measuring the height of the powder cone, according to embodiments of the invention.

Diagram 1 in the text is a diagram of the chemical structures of 12 representative surface modifying compounds. FIG. 2 is an experimental setup for determining the angle of repose, θ, by measuring the height of the powder cone, h. With reference to Diagram 1, the structural comparisons of selected surface-modifying reagents are shown.

Diagram 1.
Chemical structures of representative surface modifying compounds.

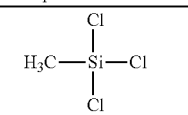

methyltrichlorosilane

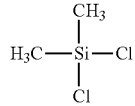

dichlorodimethylsilane

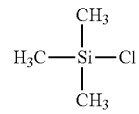

chlorotrimethylsilane

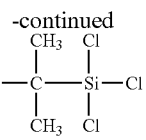

tert-butyltrichlorosilane

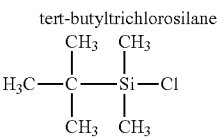

tert-butyl(chloro)dimethylsilane

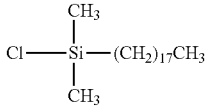

n-octadecyldimethylchlorosilane

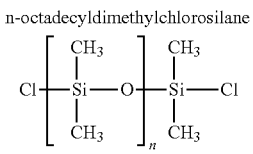

Aquaphobe CM

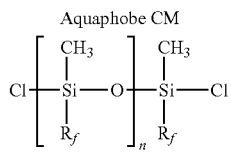

Aquaphobe CF
R$_f$ = fluoralkyl group

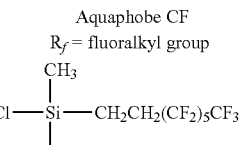

(tridecafluoro-1,1,2,2-tetrahydrooctyl) methyldichlorosilane

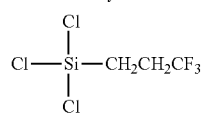

trichloro(3,3,3-trifluoropropyl)silane

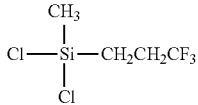

(3,3,3-trifluropropyl)dichloromethylsilane

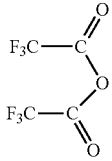

trifluoroacetic anhydride

Methods of Metal Powder Treatment

Method I. About 1.5 grams (g) of aluminum powder was placed in a 12×75 millimeter (mm) test tube that was filled with a solvent. A silane reagent was added to the test tube to give about 2-10 weight percent solution and the tube was capped with a septum. Vigorous agitation was applied several times over the course of approximately 30 minutes (min). The test tube was then centrifuged, the supernatant siphoned off, and the treated powder washed with solvent in the test tube. After centrifuging again and siphoning off the solvent rinse, the powder was dried at 110° C. for a few hours in an atmospheric oven, before collecting it for an angle of repose measurement.

Method II. About 3 g of metal powder was placed in a 30 milliliter (mL) Gooch crucible and about 0.5 Molar (M) solution of a silane reagent (or other surface modifying reagent) was added, with some stirring, to cover the powder. After about 15 min, the reagent solution was filtered off and the sample rinsed on a glass frit with solvent. After the wash was filtered off, various drying procedures were applied to the samples: (1) air dry at room temperature; (2) air dry at up to 110° C.; or, (3) dry in a vacuum oven at up to 150° C. Portions of the samples were dried for various times from 15 min to overnight. To ascertain the best conditions for an oven treatment, 45 g of H-10 Al (10 micron) (lot 01-2149) was treated with methyltrichlorosilane in heptane, and then divided into three portions. One portion was placed in a vacuum oven at about 145° C., a second portion was placed in a conventional oven at 110° C. under air, and a third portion of the sample was allowed to dry at room temperature, over a period of hours, on the fritted funnel. A few grams were removed from each sample at regular intervals for angle of repose measurement.

Method III. Two 2.2-kg batches of H-10 Al (lots 00-1143 and 02-3019) were treated with methyltrichlorosilane in either pentane or hexane, following a modification of Method II. The H-10 Al powder was divided into 1.1 kg portions and each placed in a 2.8 liter (L) fritted funnel (medium or fine frit). All treatments were carried out by slurrying the powder on the frit and then vacuum filtering to remove the liquid. The H-10 Al powder was pretreated with water, washed three times with acetone and once with pentane (or hexane), then treated with about 0.5 L of a 0.2 M solution of methyltrichlorosilane in pentane (or hexane) and washed once with the alkane solvent. The treated H-10 Al was broken up thoroughly with a spatula and dried for several hours under vacuum at 130-150° C. The dried aluminum powder was sieved to –200 mesh.

Method IV. Method III was modified somewhat for subsequent treatments of Al powders in 2.3-kg batches. The Al powder was manually mixed in a 10-L beaker with a 0.2 M methyltrichlorosilane/heptane solution (prepared with 47 mL of the silane and 2 L of heptane). The mixture was transferred to a 4-L medium-frit filter funnel, vacuum filtered, and washed once with 2 L of heptane. During the washing step the solid (metal powder) was transferred back to the beaker for easier mixing. The washed solid (metal powder) was transferred to beakers and dried overnight under vacuum at 110° C. The dried powder was sieved to –200 mesh.

Method V. For treatment of up to 15 kg batches of H-5 Al (5 micron) powder, the mixing was conducted in an 18 L stainless steel slurry kettle, equipped with a pneumatically actuated anchor blade stirrer and a water-circulating jacket. In a typical experiment, 12 kg of aluminum powder was added from plastic bags through a narrow port in the kettle top. Eight liters of the 0.02 Molar methyltrichlorosilane (prepared by adding 4.7 mL portions of methyltrichlorosilane to 2 L bottles of anhydrous hexane) was poured into the kettle. The mixture was stirred at 90 revolutions per minute for 15 min. In order to distill out the hexane and unreacted methyltrichlorosilane, water at 90-95° C. was circulated through the kettle jacket. Within 10 min the temperature of a probe in the kettle reached 70° C., where it held while the solvent distilled out and was collected through a condenser and a collection bottle. When condensate stopped forming, the temperature increased to 76-95° C., where it was held for 30-90 min. The treated powder was poured or scooped from the kettle. Since this treatment procedure was conducted in a ventilated room instead of a fume hood, protective gear worn during handling the powder included a full-face respirator with filters appropriate for dust and organic chemicals, gloves, and coveralls. The treated powder was sieved through a stack of 100, 200, and 270 mesh sieves. The scale of the Method V procedure was increased to 48 kg batches using a 95 L capacity mixer.

Method VI (used with Mg). Another variation on method II was used to treat six 2.4-kg batches of magnesium powder. Different lots of Mg powder (–325 mesh, lot numbers F20N13, D23M05, C14N27) were mixed in the same proportion for each batch and treated with a 0.02 M solution of either methyltrichlorosilane or isobutyltrichlorosilane dissolved in anhydrous heptane. The powder was mixed with the silane solution in a 10-L beaker for 15 min, and poured into a 4-L medium-frit funnel for vacuum filtration. After filtering off the silane solution, the treated powder was transferred to bottles or beakers (without a solvent rinse) and dried for 6 hours (h) under vacuum at 120° C.-150° C. The dried magnesium powder was sieved to –325 mesh.

Method VII. A vapor phase treatment was conducted by passing hot methyltrichlorosilane vapor through a filter funnel including aluminum powder placed on a fritted glass disk. The filter funnel was heated to 200° C. in an oil bath. A stream of nitrogen was first passed through a bubbler containing methyltrichlorosilane, and then through the filter funnel.

Method VIII. A secondary treatment procedure involving hexamethyldisilazane (HMDS) was used on aluminum powders treated according to Method V. The initial alkyltrichlorosilane treatment and secondary HMDS treatment were sometimes conducted in a single pot process. For example, after treating 48 kg of H-10 Al with methyltrichlorosilane in hexanes and distilling out the volatile products, the mixer and treated Al were cooled to below 50° C. Toluene (21 L) and HMDS (200 mL) were added. The mixture was stirred for about 15 min without heating. In order to distill out the toluene and unreacted HMDS (normal boiling point 125° C.), steam heat was circulated through the kettle jacket, achieving a temperature of at least 150° C., which was held for at least 30 min. After removing the product powder from the kettle, the product powder was dried under vacuum at about 120° C. for about 48 h.

Moisture sensitivity test. A portion of the 45-g sample of silane-treated H-10 Al (lot 01-2149), which had been heated in the atmospheric oven, was placed in a humidor over a saturated solution of cupric sulfate with an average relative humidity 88%, compared with the 25-30% relative humidity typical of ambient laboratory conditions. Portions of this sample were removed and analyzed for angle of repose.

Angle of Repose Measurement

An American Society for Testing and Materials (ASTM) standard procedure fixes the height of a cone of powder falling from a funnel and measures changes in the cone's diameter, calculating the angle of repose from a simple trigonometric relationship [C1444-00 *Standard Test Method for Measuring the Angle of Repose of Free-Flowing Mold Powders*: ASTM International, West Conshohocken, Pa., 2002]. In this work, the method has been adapted to samples of a few grams, instead of the pound or more called for in the ASTM standard method. The diameter of the powder cone is fixed by catching the powder poured through a Pasteur pipet in a shallow cylinder, as illustrated in FIG. 2 [http://rxsecure.umaryland.edu/courses/PHAR535/lecture_handouts/Labs/Particle-lab.pdf last accessed Feb. 2, 2004]. The angle of repose is calculated from the measured height when the powder cone no longer increases in height as additional powder poured through the pasture pipet slides off the edge of the dish. The dish sits on weighing paper so any spilled powder can be collected and, along with the powder in the dish, reused to make a subsequent measurement. Prior to angle of repose analysis, a vial containing a few grams of powder was vigorously shaken for about 30 seconds to break up clumps. Each powder was measured seven times (three times for some high angle of repose powders), the results averaged, and the 95% confidence limit calculated. In general, an angle of repose for a powder does not have a value that is established with respect to a reference standard, and the values are reported in terms of 95% confidence intervals [C1444-00 *Standard Test Method for Measuring the Angle of Repose of Free-Flowing Mold Powders*: ASTM International, West Conshohocken, Pa., 2002]. The term "angle of repose" shall be understood to refer to measurements made by the above-described method. Because the amount of powder used to make the measurement affects the precision of the measurement, the confidence intervals are two to three times greater than the ASTM standard.

FIG. 2. Experimental setup for determining the angle of repose, θ, by measuring the height of the powder cone, h. The setup in FIG. 2 has a maximum angle of repose of 60.9°, imposed by the 18 mm minimum distance from the flat surface to the tip of the pipet. In practice, the maximum angle of repose is somewhat less than this, since the pipet must be tapped vigorously to flow powders with more than a roughly 40° angle of repose. The act of tapping also introduces a lateral velocity to the falling particles that may add to the error in measuring powders with a high angle of repose. Thus, there is a leveling effect on powders with angles of repose in the 50°-60° range, such that differentiation of high angle of repose powders cannot be relied upon. It is possible to measure higher angles of repose by modifying the approach. For example, by increasing the height of the pipet and using a pipet with a larger orifice to avoid the need for tapping, an angle of repose of 66° was determined for an untreated H-5 aluminum powder.

The quantitative results are also somewhat dependent on the detailed procedure for the more free-flowing powders (with an angle of repose that is about 30 degrees or less), because a rapid flow of powder can flatten the pile upon impact. For example, for a powder that exhibited a 23° angle of repose by the usual procedure, an angle of repose of 31° was obtained by slowly adding small amounts of powder to the pipet.

The treated powders with low angle of repose tend to become remarkably fluid-like when aerated by brief shaking, yet are rather resistant to flow when at rest and not aerated. The treated powders also have a greater tendency to form suspended dust. Flow rate measurements of treated H-5 aluminum powders by the method of ASTM B213-03 (Standard Test Method for Flow Rate of Metal Powder: ASTM International, West Conshohocken, Pa., 2003) were not successful due to inadequate flowability of the powder when at rest. There is a general tendency of these powders to continue in motion once set in motion. When larger amounts of powder flow out of a funnel the resultant pile has a wide base and slope that is relatively steep near the middle of the pile, but shallow along the vast outer parts of the pile. Due to this behavior, angle of repose measurement using the procedure of ASTM C1444-00 will give very low values compared to the maximum slope that the powder will maintain. For example, a treated H-5 aluminum powder with a 39° angle of repose measured by the pipet method gave a value of 22° when a bulk sample flowed out of a funnel.

Gravimetric Analysis

To check for significant mass change upon silane treatment, careful measurements of the aluminum powder mass were conducted. Four samples of H-10 Al lot 01-2149 were treated with chlorotrimethylsilane, methyltrichlorosilane, trifluoroacetic anhydride and tert-butyl(chloro)dimethylsilane, respectively. At each step in the process, the samples were weighed five times and average masses and 95% confidence intervals determined.

Thermogravimetric analysis was conducted on a TA Instruments Hi-Res TGA2950 Thermogravimetric Analyzer. Analysis was carried out on H-10 Al (lot 01-2149) treated with tert-butyl(chloro)dimethylsilane in heptane, an untreated sample of H-10 Al (lot 01-2149) and an empty reference pan. The heating profile was: hold 30 min at room temperature (except for no room temperature hold on the treated sample), ramp at 20° C./min to 400° C., hold for 960 min at 400° C.

Scanning Electron Microscopy

Scanning electron microscope (SEM) images were collected with an Electroscan Environmental Model E-3 microscope. The samples were prepared by taking a few milligrams of powder and placing it on the middle of a sample holder (a small aluminum disk with a piece of carbon double stick tape on it). The powder was smeared out, using light pressure, with a spatula to ensure the particles adhered to the tape without large clumps (the imaging was of particles at the edge of the smear). Then, the sample was sputter coated with a layer of gold, about 15 nanometers. The digital images were adjusted for brightness and contrast.

Diffuse Reflectance Fourier Transform Infrared Spectroscopy

The diffuse reflectance, Fourier transform infrared (FM) spectra were collected with a Foundation Series diffuse reflectance accessory on a Thermo Nicolet 870 spectrometer, utilizing a mid-band, mercury-cadmium-telluride (MCT) detector. Each spectrum consisted of the Fourier transform of 256 co-averaged interferograms with nominal resolution of 8 cm$^{-1}$ and multiplied by a Happ-Genzel apodization function. The single beam spectra of sample aluminum powders were ratioed to the single beam spectrum of an untreated aluminum powder reference to give the reflectance of the sample. The reflectance was scaled to unity in the featureless region of 2000-2500 cm$^{-1}$. The scaled reflectance was converted to Kubelka-Munk units of remission with the standard formula: Reflectance, $R=R_{sample}/R_{reference}$; Kubelka-Munk Function, $F(R)=(1-R)^2/(2*R)$. Remission bears a similar relationship to reflectance as absorption does to transmission and can be viewed as directly comparable to an absorption spectrum. The wavenumber axes of the experimental data were scaled to those of literature infrared absorption spectra for convenient comparison.

Ion Chromatography for Chlorine Analysis

Samples for chlorine analysis were prepared as follows. One gram of aluminum powder was added to 20 mL of 50:50 water:ethanol solution, the mixture was sonicated for 1 h, then filtered through a 0.45 micron filter, then diluted with water to 50 mL. The concentration of chlorine was quantified by ion chromatography analysis.

Inductively Coupled Plasma-Atomic Emission Spectroscopy (ICP-AES) for Silicon and Trace Metal Analysis For Si and trace metal analysis, 0.5 g of aluminum powder was first "wet" with a small amount of 10% ethanol/water solution, then digested in nitric acid using microwave digestion, then the samples were diluted with water. The concentrations of Si, Fe, Ni, and Ti were quantified by ICP-AES analysis.

Tap Density

Tap density of aluminum powders was determined by manually tapping a 50 mL glass graduated cylinder against a hard bench top, approximating the method described in ASTM Standard B 527-93 (*Standard Test Method for Determination of Tap Density of Metallic Powders and Compounds*, Reapproved 2000: ASTM, West Conshohocken, Pa., 2000), where the drop height is specified as 3 mm and the tapping frequency is between 100 and 300 taps/minute. Prior to weighing a sample for analysis, the powder was vigorously shaken in its container for about 30 seconds to break up clumps. The sample weight was typically 43 g for aluminum powders.

Discussion of Examples and Equivalents

An object of the present invention is to improve the flow characteristics of reactive metal powders. The H-10 aluminum powders from lots 00-1179 and 00-1134 were observed to have relatively good flowability, however, H-10 Al from lots 01-2149 and 02-3019 were observed to have relatively poor flowability. The results in Table 2 show that the angle of repose measurement differentiates between the powders that showed relatively good flowability (having approximately 40° angle of repose) and those which did not (having an angle of repose in the range 50°-55°). This is consistent with the correlation that a powder with greater flowability will have a smaller angle of repose than a powder that is less fluid. Powders with good flow behavior tend to have a low angle of repose, a low surface area, and a high flow index from shear flow tests. However, none of these characteristics alone is a reliable indicator of good flow performance. The H-10 Al powders were compared with untreated powders of smaller size and it is shown in Table 2 that the smaller diameter particle powders generally have higher angles of repose, with values similar to the highest values among the H-10 lots.

TABLE 2

Angle of repose measurements for untreated aluminum powders of various lots.

| Aluminum Powder | Lot # | Angle of Repose (degrees) | 95% confidence level (degrees) |
|---|---|---|---|
| H-10 | 00-1134 | 39.0 | 3.2 |
|  | 00-1143 | 50.5 | 3.2 |
|  | 00-1179 | 40.4 | 4.5 |
|  | 01-2149 | 55.2 | 2.9 |
|  | 02-3019 | 53.8 | 1.9 |
| H-5 | 87-8204 | 55.4 | 2.4 |
|  | 01-2071 | 55.5 | 1.0 |
| H-3 | 01-2142 | 55.8 | 2.9 |
| H-2 | 01-2024 | 58.4 | 4.3 |

One known strategy to improve flowability of a powder is to add a "glidant" including fumed silica [Mei, R.; Klausner, J. F.; Shang, H.; Kallman, E. "On the improved flowability of cohesive powders by coating with fine particles" in Processing and Handling of Powders and Dusts; Eds. Battle, T. P.; Henein, H.; TMS: Warrendale Pa., 1997, 225-236]. Fumed silica was employed for this purpose in a 1% mixture with H-10 Al, lot 01-2149. The mixture appeared more fluid than the plain powder when poured and had a lower angle of repose, 45.6°±2.1°, compared to 55.2°±2.9° for the untreated powder, as is shown in Table 3.

TABLE 3

Angle of repose measurements for H-10 Al, lot 01-2149, treated with various reagents.

| Reagent | Solvent | Angle of Repose (degrees) | 95% confidence level (degrees) |
|---|---|---|---|
| tert-butyltrichlorosilane | hexane | 29.5 | 2.2 |
| methyltrichlorosilane | avg. for various solvents | 31.2 | 1.4 |
| n-propyltrichlorosilane | heptane | 34.5 | 6.5 |
| trichloro(3,3,3-trifluoropropyl)silane | hexane | 34.6 | 3.9 |
| iso-butyltrichlorosilane | heptane | 35.4 | 3.2 |
| tert-butyl(chloro)dimethylsilane | hexane, run 1 | 43.0 | 2.4 |
| tert-butyl(chloro)dimethylsilane | hexane, run 2 | 44.9 | 2.2 |
| dichlorodimethylsilane | heptane | 45.5 | 2.0 |
| fumed silica blended in, 1% by weight | none | 45.6 | 2.1 |
| Aquaphobe CF ® | hexane | 47.3 | 1.5 |
| (3,3,3-trifluoropropyl)dichloromethylsilane | hexane | 48.7 | 2.5 |
| n-octadecyldimethylchlorosilane | heptane | 54.6 | 2.0 |
| n-octadecyltrichlorosilane | heptane | 54.7 | 4.8 |
| trifluoroacetic anhydride | heptane | 55.1 | 2.8 |
| untreated | none | 55.2 | 2.9 |
| chlorotrimethylsilane | heptane | 55.7 | 2.9 |
| Aquaphobe CM ® | hexane | 56.0 | 1.8 |
| (tridecafluoro-1,1,2,2,tetrahydrooctyl)methyldichlorosilane | heptane | 56.1 | 2.6 |
| chlorotrimethylsilane | hexane | 62.1 | 2.1 |

A second strategy to improve powder flowability is to reduce the cohesive forces between the particles by treating the surface chemically. Chemical treatments are routinely done to reduce the adhesive forces between solid surfaces and liquids, such as water, by treating the surface with hydrophobic coatings [Johnson, C. E.; Harris, D. C.; Nelson, J. G.; Kline, C. F.; Corley, B. L. "Strengthening of Glass and Pyroceram with Hydrophobic Coatings" NAWCWD TP 8536, April 2003.]. In initial experiments aluminum powders were treated with silane reagents and then washed with solvent using a centrifuge for separation according to Method I. In some later experiments the powders were washed using filtration according to Method II, since this approach is more amenable to scale up.

Tables 3, 4, and 5 report the results for treated aluminum powders, showing that the angle of repose was decreased by as much as 30 degrees as a result of silane treatment. Table 3 lists angle of repose measurements (an average value is reported) for H-10 Al (lot 01-2149) treated with various reagents. Based on this initial screening of alkylchlorosilanes, methyltrichlorosilane was selected for further investigation because of its high efficacy in lowering the angle of repose, its relatively low cost and convenient properties as a volatile liquid. Table 4 reports further details for experiments using methyltrichlorosilane in which such parameters as the scale, solvent or adding a pretreatment, and the like are varied.

TABLE 4

Angle of repose measurements ordered by solvent for H-10 Al, lot 01-2149, treated with methyltrichlorosilane.

| Solvent and Treatment Conditions | Angle of Repose (degrees) | 95% confidence level (degrees) |
|---|---|---|
| heptane, 1/10 lb scale-up | 35.5 | 3.6 |
| heptane, 33 days at 88% relative humidity | 31.4 | 3.7 |
| heptane, aqueous pretreatment | 32.4 | 2.7 |
| heptane, pH 9 aqueous ammonium hydroxide pretreatment | 31.8 | 2.9 |
| heptane, redetermine angle of repose with 36% relative humidity for 1/10 lb scale-up | 35.3 | 2.0 |
| heptane, run 1 | 32.3 | 2.1 |
| heptane, run 2 | 31.0 | 2.3 |
| heptane, run 3 | 29.8 | 1.9 |
| heptane, run 4 | 29.3 | 2.7 |
| heptane, stored under vacuum for 6 days | 29.9 | 2.3 |
| hexane, run 1 | 40.8 | 2.4 |
| hexane, run 2 | 38.9 | 3.3 |
| neat, no solvent | 33.4 | 2.0 |
| pentane, second of two treatments | 27.4 | 1.7 |
| pentane, first of two treatments | 34.8 | 2.8 |
| toluene | 29.3 | 2.0 |
| dichloromethane | 26.2 | 2.4 |
| untreated | 55.2 | 2.9 |

Surprisingly little, if any, lowering of the angle of repose was measured for samples of H-10 Al treated with commercial hydrophobic reagents (as shown in the entries for Aquaphobe CM® and Aquaphobe CF® in Table 3) or treated with alkylchlorosilanes with long alkyl chains (as shown in the entries for n-octadecyltrichlorosilane, n-octadecyldimethylchlorosilane and (tridecafluoro1,1,2,2tetrahydro-octyl)methyldichlorosilane in Table 3).

TABLE 5 shows the results of alkylsilane treatments of the smaller particle size aluminum powders. Angle of repose measurements for treated aluminum powders of various lots.

| Aluminum Powder | Lot # | Treatment | Angle of Repose (degrees) | 95% confidence level (degrees) |
|---|---|---|---|---|
| H-5 | 87-8204 | methyltrichlorosilane | 23.5 | 3.0 |
|  | 87-8204 | KEL-F | 48.7 | 2.6 |
|  | 87-8204 | untreated | 55.4 | 2.4 |
|  | 01-2071 | methyltrichlorosilane | 29.3 | 3.2 |
|  | 01-2071 | untreated | 55.5 | 1.0 |
|  | 02-3090 | Methyltrichlorosilane (Method IV) | 42.0 | 1.8 |
|  | 02-3090 | Methyltrichlorosilane (Method V) | 21.8 | 2.5 |
|  | 02-3090 | Methyltrichlorosilane (Method V), dried at 96° C. for 24 h | 20.9 | 3.4 |
|  | 02-3090 | untreated | 57.3 | 3.4 |
| H-3 | 01-2142 | two treatments, methyltrichlorosilane | 46.9 | 2.3 |
|  | 01-2142 | one treatment, methyltrichlorosilane | 53.4 | 2.6 |
|  | 01-2142 | untreated | 55.8 | 2.9 |
|  | 02-3050[a] | 0.02M methyltrichlorosilane | 34.7 | 8.5 |
|  | 02-3050 | 0.2M methyltrichlorosilane | 34.1 | 4.6 |
|  | 02-3050 | 2.0M methyltrichlorosilane | 33.8 | 6.0 |
|  | 02-3050 | neat methyltrichlorosilane (8.5M) | 30.0 | 5.9 |
| H-2 | 01-2024 | two treatments, methyltrichlorosilane | 55.2 | 2.2 |
|  | 01-2024 | one treatment, methyltrichlorosilane | 55.4 | 2.1 |
|  | 01-2024 | untreated | 58.4 | 4.3 |

[a]Untreated powder was too clumpy to flow through the angle of repose apparatus.

Diffuse reflectance FTIR spectroscopy was used to characterize the silane-treated aluminum powders. The diffuse reflectance spectrum for the n-octadecyldimethylchlorosilane treated powder is presented in FIG. 1. Comparison of the spectrum of the treated powder with a literature spectrum of n-octadecyldimethylchlorosilane shows the presence of the n-octadecyldimethylsilanyl group in the treated sample. Similar features include peaks in the C—H stretch region at 3000-2800 cm$^{-1}$, the peak at 1253 cm$^{-1}$ assigned to the symmetric deformation of Si—CH$_3$ (typically observed in the region of 1280-1250 cm$^{-1}$) and the peaks in the region around 790-840 cm$^{-1}$, assigned to symmetrical and unsymmetrical Si—C stretches and methyl rocking of the dimethyl silicon unit [Chaipanit, N.; Rattanakhongviput, C.; Sundaraajan, R. "2001-CEIDP: Accelerated multistress aging of polymeric insulators under San Francisco coastal environment" http://www.east.asu.eduktas/multistress/Papers/2001ISH5,pdf last accessed Feb. 2, 2004]. The peak at 1072 cm$^{-1}$ is not observed in the literature spectrum of n-octadecyldimethylchlorosilane, and is assigned to a strong Si—O stretching mode, which is consistent with the silane binding to the aluminum oxide passivation layer on the aluminum particles (although dimeric siloxanes could also give rise to a peak in the same region) [Brook, M. A. *Silicon in organic, organometallic and polymer chemistry*; Wiley-Interscience: New York, 2000, p 150.] and [Stubican, V.; Roy, R. "Infrared spectra of layer-structure silicates" J. Amer. Ceram. Soc. 1961, 44, 625-627]. Because untreated H-10 Al (lot 01-2149) is used as the reference in the diffuse reflectance FTIR experiments, the diffuse reflectance spectra show the change in the surface after treatment compared with before treatment, i.e., the presence or absence of alkylated silanyl groups respectively.

The high angles of repose for the n-octadecyldimethylchlorosilane, n-octadecyltrichlorosilane and (tridecafluoro-1,1,2,2,tetrahydrooctyl)methyldichlorosilane treated powders indicates that the treated powder's cohesive force is comparable to that of the untreated powder. This suggests that long alkyl chains may create a cohesive force that is dispersive in nature (i.e., non-polar interactions), and similar in magnitude to the predominantly polar cohesive forces acting between untreated aluminum particles. The performance of the commercial waterproofing silanes, however, require a different explanation. Aquaphobe CM® has only methyl groups attached to its siloxane backbone, and it failed to improve the angle of repose. A possible explanation for this observation is a reduced coverage of the particle surface by the silane.

Figure 3:
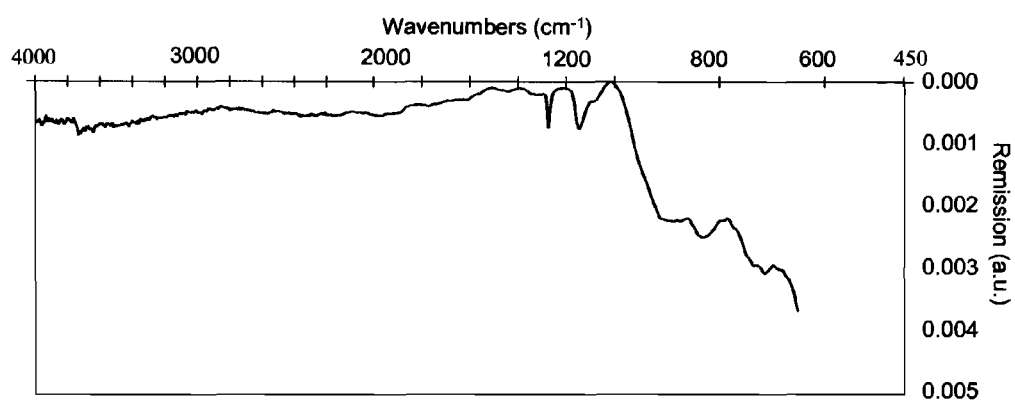
FIG. 3 of the drawings is a diffuse reflectance FTIR spectrograph of H-10 Al powder, lot 01-2149, treated with methyltrichlorosilane in heptane, according to embodiments of the invention.
Figure 4:
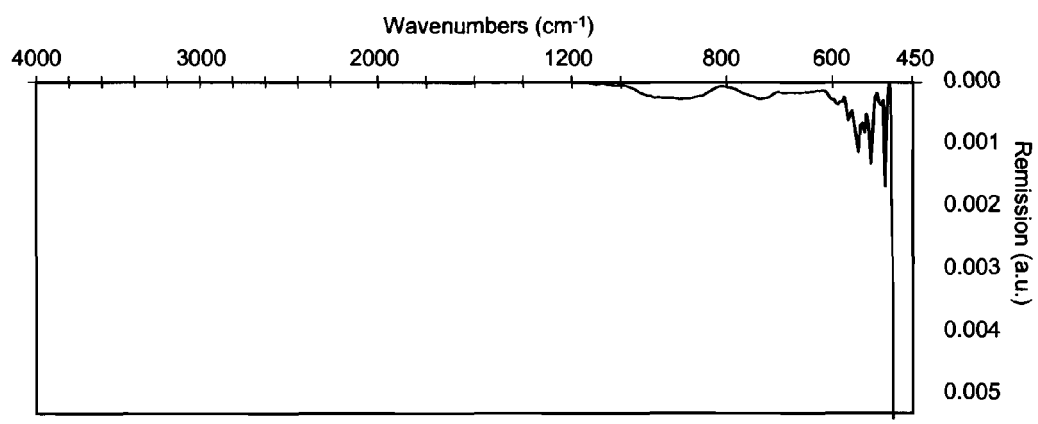
FIG. 4 of the drawings is a diffuse reflectance FTIR spectrograph of H-10 Al powder, lot 01-2149, treated with chlorotrimethylsilane in heptane, according to embodiments of the invention.

In contrast to the long-chain alkyl chlorosilanes, trichlorosilanes with short chain lengths were very effective in lowering the angle of repose of treated metal powders. Methyltrichlorosilane treatment in particular yielded powders that appear very fluid when poured and that have an average angle of repose of about 31°, with a minimum value of 26°. The FTIR spectrum of methyltrichlorosilane treated H-10 Al powder, shown in FIG. 3, is poorly resolved compared with a literature spectrum of methyltrichlorosilane. The peak at 1277 cm$^{-1}$ in FIG. 3 is assigned to the symmetric deformation of the Si—CH$_3$ group [Smith, A. L. "The infrared spectra of methyl chlorosilanes" *J. Chem. Phys.* 1953, 21, 1997-2004.], and the peak at 1153 cm$^{-1}$ is assigned to a Si—O stretch. These peak assignments are consistent with either a methylsilane bound individually to the aluminum oxide surface by up to three Al—O—Si bridges, or with oligomeric networks of methyl siloxanes bound at multiple points to the surface by bridging oxygens. By way of contrast, the FTIR spectrum of chlorotrimethylsilane treated H-10 Al powder, FIG. 4, shows no peaks in the in the regions of 1280-1250 cm$^{-1}$ or 1150-1000 cm$^{-1}$, suggesting that no significant amounts of silane have been bound to the surface. Thus, it seems likely that observed clumpy flow on pouring the chlorotrimethylsilane treated H-10 Al powder and its high angle of repose (55.7°±2.9°) is due to the polar cohesive forces as in untreated powders. The 98% purity of the chlorotrimethylsilane reagent was verified by NMR and the experiment was repeated with a freshly opened bottle of reagent, demonstrating that the lack of improvement in flowability characteristics was not due to a bad batch of reagent. As expected, the angle of repose of the dichlorodimethylsilane treated surface (angle of repose 45.5°±2.0°) falls between those of the methyltrichlorosilane and chlorotrimethylsilane treated surfaces. In this regard, the FTIR spectrum of dichlorodimethylsilane treated H-10 Al (not shown) has a peak at 1265 cm$^{-1}$ that is assigned to the symmetric deformation of the Si—CH$_3$ group. Thus, the presence (or absence) of diffuse reflectance FTIR peaks appear to be indicative of the presence (or absence) of a surface modifying reagent linked to the particles. However, without an internal standard it is not possible to assess the degree of particle surface covered by a surface modifying agent or to determine how surface coverage might affect the angle of repose. One possibility is that the degree of coverage is related to the degree of connectivity between the silane and surface, e.g. a trichlorosilane can form up to three bridging oxygen links, a dichlorosilane up to two and a monochlorosilane only one. Since the binding of the silane to the surface has a dynamic equilibrium (i.e., the breaking and reforming of the bridging oxygen tethers), surface-modifying molecules with multiple tethers to the surface will be more securely bound.

The trend of decreasing angle of repose with increasing number of chlorides attached to the silane is also consistent with the results for (3,3,3-trifluoropropyl)dichloromethylsilane (angle of repose 48.7°±2.5°) and trichloro(3,3,3-trifluoropropyl)silane (angle of repose 34.6°±. This trend is also observed in the case of tert-butyl(chloro)dimethylsilane (angle of repose 43.0-44.9°, Table 3) and tert-butyltrichlorosilane (angle of repose 29.5°±2.2°).

Figure 5:
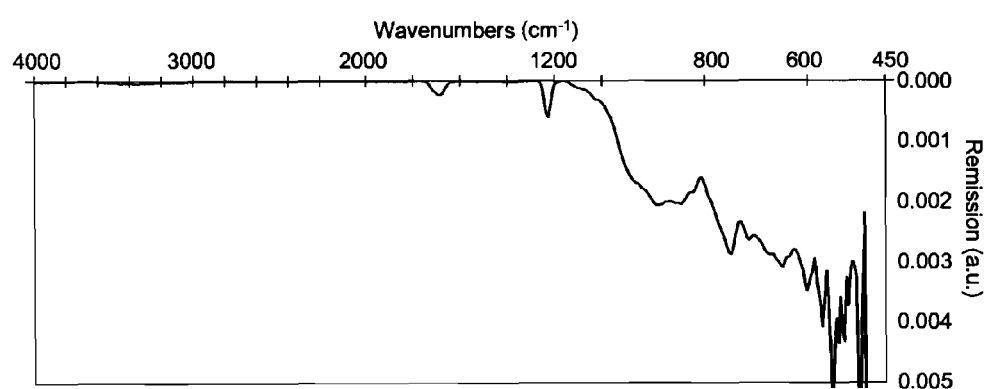
FIG. 5 of the drawings is a diffuse reflectance FTIR spectrograph of H-10 Al powder, lot 01-2149, treated with tert-butyl(chloro)dimethylsilane in heptane, according to embodiments of the invention.

The FTIR spectrum of the H-10 Al powder treated with tert-butyl(chloro)dimethylsilane, shown in FIG. 5, is also poorly resolved compared to a literature spectrum of the parent silane. The peak at 1250 cm$^{-1}$ is assigned to the symmetric deformation of the Si—CH$_3$ group and is taken as an indication of successful surface modification.

Another dimension of the silane connectivity is the ability of the di- and trichlorosilanes to form complex siloxane oligomers or polymeric material. As noted above, the FTIR results do not rule out the presence of siloxane oligomers. To assess any significant change in mass following silane treatment, which would be indicative of the formation of a bulk second phase polymeric siloxane, four approximately 3 g samples of H-10 Al (lot 01-2149), were treated with different surface modifying reagents. The results are as follows for the change in mass of sample upon treatment (±the 95% confidence level): chlorotrimethylsilane (−1.8 mg±3.0 mg), methyltrichlorosilane (−3.8 mg±5.1 mg), trifluoroacetic anhydride (−2.0 mg±2.1 mg) and tert-butyl(chloro)dimethylsilane (−2.4 mg±2.3 mg), respectively. Since the confidence limits are close to or exceed the mass loss, the mass change upon treatment may be considered negligible.

Figure 6:
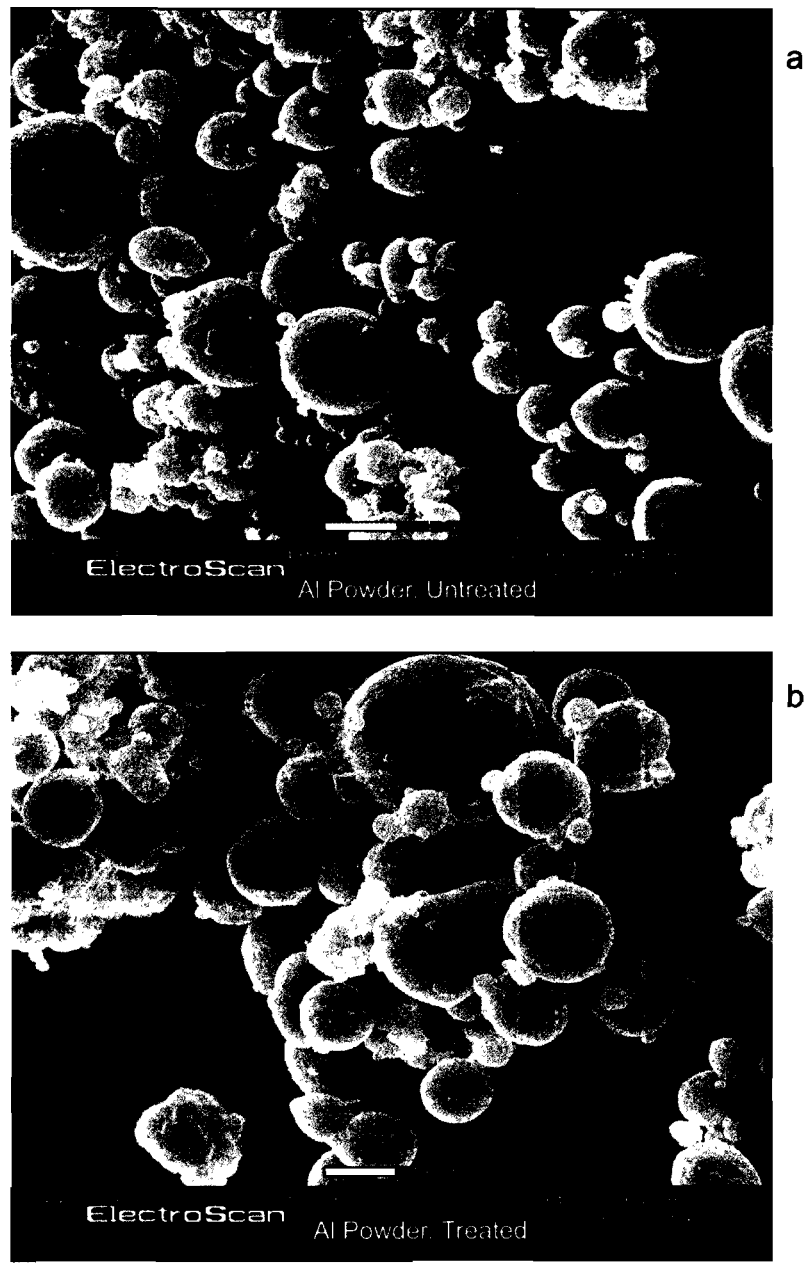
FIG. 6 of the drawings are SEM images of H-10 Al, lot 01-2149, (a) untreated, and (b) treated with methyltrichlorosilane, according to embodiments of the invention.

Similar results were obtained in TGA experiments that showed no significant difference among weight changes for TGA runs with an empty pan and a pan loaded with untreated or tert-butyl(chloro)dimethylsilane treated H-10 Al. Based on an estimation of approximately 0.1% by weight surface bound silane, the expected mass changes would be near the sensitivity limit of the TGA instrument for 10 mg samples. The TGA results, taken together with the gravimetric results demonstrate that there is no significant retention of a bulk second phase of siloxanes in the treated H-10 Al samples. Further, the SEM images shown in FIGS. 6a and 6b show that the morphology of the H-10 Al particles remain substantially unchanged by treatment with methyltrichlorosilane in heptane. All of the foregoing results are consistent with the suggestion that a change in the surface chemistry of metal particles composing a powder alters the flow characteristics of the powder.

Simple carboxylates, such as those derived from acetic acid [de Cheveigne, S.; Gauthier, S.; Klein, J.; Leger, A. "Adsorption of marked acetic acid on alumina studied by IETS" in Vibrations at Surfaces: Eds. Caudano, R.; Gilles, J.-M., Lucas, A. A: Plenum, New York, 1982, 465-470.], and acid anhydrides [Schultz, J.; Lavielle, L.; Carre, A.; Comien, P., *J. Mater. Sci.* 1989, 24, 4363] are known to adsorb on alumina surfaces. The H-10 Al (lot 01-2149) exposed to trifluoroacetic anhydride in heptane for 15 min showed no significant change in its angle of repose (55.1°±2.8°). The scaled FTIR spectrum (not shown) did not exhibit any significant differences from the scaled blank FTIR, thus it may be concluded that the carboxylate groups did not attach to the surface of the particles sufficiently to alter inter-particle cohesive forces.

The number of surface binding sites is a factor that affects the binding of surface modifying agents. In the case of silane, it may be possible to increase surface coverage by increasing the number of hydroxyl groups on the particle surface by pretreatment with an acidic or alkaline wash. This approach has been reported for the preparation of silane coated aluminum surfaces, utilizing aqueous solutions at pH 5 or pH 9 [Underhill, P. R.; DuQuesnay, D. L. "The reaction of water with abraded aluminum surfaces as studied by Fourier transform infrared spectroscopy" *App. Surf. Sci.* 1999, 141, 138-140]. Methyltrichlorosilane treated H-10 Al (lot 01-2149) powder, pretreated with pH 9 ammonium hydroxide solution (angle of repose 31.8°±2.9°), or with pH 7 water (angle of repose 32.4°±2.7°), does not have a different angle of repose compared with matched samples treated only with methyltrichlorosilane in heptane.

The high angle of repose for the (tridecafluoro-1,1,2,2,tetrahydrooctyl)methyldichlorosilane treated powder (angle of repose 56.1°±2.6°) suggests that the powder's cohesive forces are not mitigated by fluorination of the alkylsilane. Likewise a comparison of n-propyltrichlorosilane (angle of repose 34.5°±6.5°) treated powder with trichloro(3,3,3-trifluoropropyl)silane (angle of repose 34.6°±3.9°) treated powder shows no change in the angle of repose. The Aquaphobe CF® (angle of repose 47.3°±1.5°) treatment does show improvement compared to Aquaphobe CM® (angle of repose 56.0°±1.8°), however, uncertainty as to the relative degree of oligomerization of the Aquaphobe products as well as uncertainty regarding the differing lengths of the carbon side chains means these results are not strictly comparable. The results for H-5 aluminum (lot 87-8204) coated with the fluorinated polymer KEL-F (angle of repose 48.7°±2.6°) also showed a modest reduction of the angle of repose, but lesser in degree than that of H-5 Al treated with methyltrichlorosilane. These data suggest the conclusion that perfluoroalkyl groups offer no advantage over alkyl groups in reducing the angle of repose of aluminum powders of the sizes examined.

Five-pound batches of H-10 Al were successfully treated with methyltrichlorosilane by Method III to yield powders that had reduced angles of repose, (31.6°±2.4° versus 50.5°±3.2° for untreated lot 00-1143, and 29.0°±2.4° versus 53.8°±1.9° for untreated lot 02-3019). Testing of these treated samples showed improved flow characteristics. In these treatment experiments, the limiting process steps for increasing the throughput for the five-pound or larger scale treatments were the aqueous pretreatment and the use of a small vacuum oven to dry the treated powders. Since, as discussed herein, an aqueous pretreatment does not significantly effect the change in the angle of repose, this step was eliminated in subsequent treatments along with elimination of the washings with acetone and hydrocarbon, as set forth in Method IV.

Figure 7:
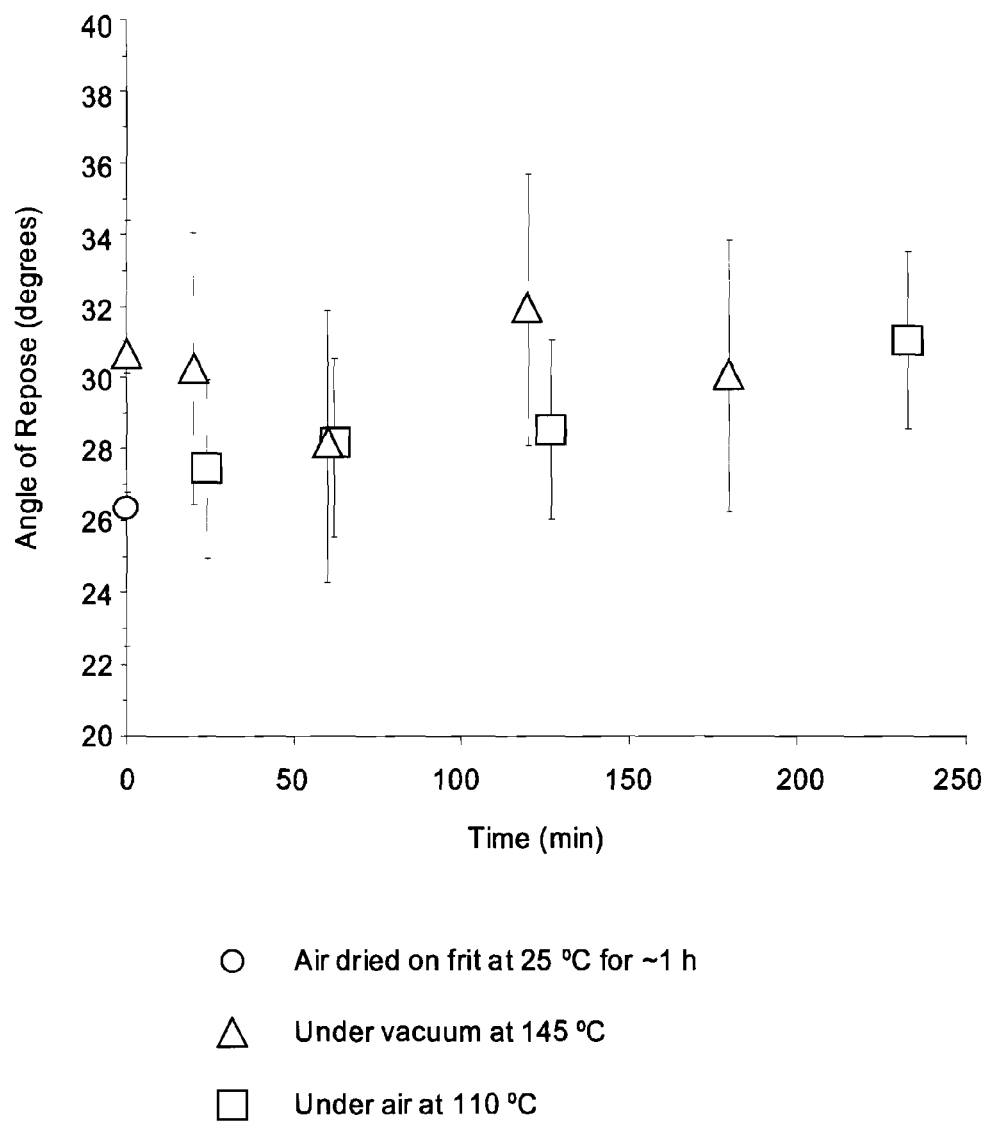
FIG. 7 of the drawings is a plot of angle of repose versus heating time for H-10 aluminum samples dried in air on a filter frit, in a vacuum oven and in a vented oven, according to embodiments of the invention.

FIG. 7 shows that there is no significant difference in the angles of repose measured after drying a treated H-10 aluminum powder in an atmospheric oven compared to drying in a vacuum oven. Thus, the heating step may be carried out in an atmospheric oven to increase throughput. During the angle of repose measurements, clods of powder sometimes clog the pipette tip, even for some powders with small angles of repose. A sieving step removed these clods of powder from the product.

With further reference to Table 5, treatment of smaller sized aluminum particles with the aforementioned surface modifying agents was usually very effective in reducing the angle of repose measured for H-5 Al, sometimes effective in reducing the angle of repose measured for H-3 Al, and not effective in reducing the angle of repose measured for the one lot of H-2 Al examined. A second treatment of H-3 (lot 01-2142) did show a further modest reduction of the angle of repose. However, a second treatment of the H-2 Al with methyltrichlorosilane did not further change the angle of repose.

The silane treatment process may be useful in improving the mixing and dispersion behavior of nano-sized powders, which tend to incompletely disperse and form high viscosity mixes due to their high surface area. Three nano-sized aluminum powders (110, 138, and 165 nm average diameter) were treated with a 0.2M iso-butyltrichlorosilane solution in heptane. The 138-nm powder was first treated according to Method II on a 2.3 g scale. The treatment was then conducted according to Method III on a 50 g scale, where there appeared to be some gas evolution 5 min after the reagents were mixed. The 110 nm and 165 nm powders were then treated according to Method IV on a 50 g scale, with the mixing conducted at 0° C., where no gas evolution was observed.

In most experiments the concentration of the silane reagent in the treatment solution had little effect on the angle of repose of treated H-3 and H-5 samples, with 0.02 M silane solutions about as effective as more concentrated silane solutions in reducing the angle of repose. However, in some large scale treatments of H-5 aluminum a 0.08M concentration of methyltrichlorosilane was more effective than the usual 0.02M concentration. The results for H-3 Al are shown in Table 5. It will be appreciated that the flow characteristics of methyltrichlorosilane treated H-3 Al powder are similar to those of methyltrichlorosilane treated H-10 Al powder, as high flowability aluminum powders were not previously available in sizes below 10 micrometers.

An improved procedure, Method V, was developed to treat aluminum powders on a 15 kg scale using a slurry kettle. In the procedure of Method V the solvent and any excess methyltrichlorosilane are distilled off rather than being separated from the powder by filtration. To facilitate solvent removal and product drying, hexane (boiling point 69° C.) is used in Method V rather than heptane (boiling point 98° C.), which is used in Method IV. Any residual methyltrichlorosilane (boiling point 65° C.-66° C.) distills off with the hexane. Method V yields a superior treated metal powder having angles of repose as low as 21°, compared to 42°±1.8° for the same lot of aluminum powder treated according to Method IV, as is also shown in Table 5. Additional drying in an oven occasionally resulted in a reduced angle of repose of treated metal powders prepared by Method V. In one case heating a treated H-5 aluminum powder overnight at 123° C. resulted in the angle of repose decreasing from 45° to 37.5°. The slurry kettle procedure is successful in reducing the angle of repose and in reducing labor and material costs. The additional reduction in angle of repose of treated metal powders prepared by Method V may result from the powder being stirred during the drying process, and/or from the surface modifying agent being heated to 69° C. while in contact with the aluminum particles.

Silane treated H-5 aluminum powders prepared by Method V were analyzed to determine the extent of incorporation of silicon and chlorine. The chlorine content (determined by a solvent extraction process) ranged from 0.012-0.015% for three powders treated with 0.02M methyltrichlorosilane solution. Chlorine was not detected in the untreated powder (level below 0.0024%). The total chlorine available from the silane reagent was 0.11%, indicating that approximately 10% of the available chlorine was retained in the treated powder. When the methyltrichlorosilane concentration was increased to 0.08M in the treatment process, the incorporated chlorine content in the treated powder increased to 0.021-0.023%.

Silicon content was determined by completely digesting aluminum powder samples in nitric acid. Untreated H-5 aluminum powders contained about 0.035% Si, while 0.02M methyltrichlorosilane treatment led to approximately 0.043% Si, and 0.08M methyltrichlorosilane treatment led to approximately 0.046% Si. The amount of Si attributed to the silane treatment is approximately 0.008-0.011%, which compares to 0.031% Si available from a 0.02M methyltrichlorosilane treatment. The combined amount of Si and Cl added by the treatment process is approximately 0.02-0.04%, indicating that the amount of the added silane material is less than 0.1% of the powder mass.

The flow characteristics of magnesium-aluminum alloy and magnesium powders were also examined. Table 6 lists the angles of repose for untreated samples of magnesium powder and two different magnesium-aluminum alloy powders. Table 6 shows that there is lot to lot variance between nominally equivalent powders from the same distributor. The −200 mesh sized Mg and Al-30% Mg powders had the lowest angles of repose.

TABLE 6

Angle of repose measurements for untreated magnesium and magnesium-aluminum alloy powders.

| Sample description | Angle of Repose (degrees) | 95% confidence level (degrees) |
|---|---|---|
| Mg, −325 mesh | | |
| lot C14N27 | 52.9 | 3.5 |
| lot D23M05 | 45.3 | 2.5 |
| lot D23M05 | 46.3 | 3.1 |
| lot F20N13 | 48.9 | — |
| lot F20N13, vac 120° C., ~2 h | 53.6 | 4.1 |
| lot K03J26 | 51.7 | 1.3 |
| Mg, −200 mesh | 40.0 | 2.6 |
| Al-30% Mg | | |
| −325 mesh (lot number not available) | 56.3 | 2.7 |
| lot 02-3023s, −200 mesh | 35.1 | 2.0 |
| Al-50% Mg, −270 mesh | | |
| lot 97-8067S | 47.4 | 1.8 |
| lot 01-2025s | 50.1 | 3.2 |

The typically high angles of repose for magnesium powder and the magnesium-aluminum alloy powders are dramatically reduced by treatment with the surface modifying agents, as is shown in Tables 7, 8 and 9.

TABLE 7

Angle of repose measurements for silane-treated aluminum alloy powders containing 50% magnesium.

| Sample description | | Angle of Repose (degrees) | 95% confidence level (degrees) |
|---|---|---|---|
| Al-50% Mg, −270 mesh, lot 97-8067S | | | |
| Reagent | Comments | | |
| none | untreated | 47.4 | 1.8 |
| tert-butyltrichlorosilane in heptane | vac 110° C., ~20 min | 40.6 | 4.7 |
| chlorotrimethylsilane in heptane | vac 110° C., ~20 min | 50.4 | 1.6 |
| methyltrichlorosilane in hexane | run 1, 1st treatment, air 25° C., ~2 h | 38.5 | 2.3 |
| methyltrichlorosilane in hexane | run 1, 2nd treatment, air 25° C., ~2 h | 47.9 | 0.9 |
| methyltrichlorosilane in hexane | run 1, 2nd treatment, stored 4 months | 33.5 | 2.4 |
| methyltrichlorosilane in hexane | run 2, 1st treatment, air 25° C., ~2 h | 45.0 | 2.6 |
| methyltrichlorosilane in hexane | run 2, 2nd treatment, air 25° C., ~2 h | 48.3 | 1.6 |
| methyltrichlorosilane in hexane | run 2, 1st treatment, vac 110° C. | 44.1 | 2.0 |
| methyltrichlorosilane in hexane | run 2, 2nd treatment, vac 110° C. | 39.5 | 3.7 |

TABLE 8

Angle of repose measurements for silane-treated aluminum alloy powders containing 30% magnesium.

| Sample description | | Angle of Repose (degrees) | 95% confidence level (degrees) |
|---|---|---|---|
| Al-30%Mg, −325 mesh | | | |
| Reagent | Comments | | |
| methyltrichlorosilane in hexane | air 25° C., ~2 h | 34.6 | 3.5 |
| methyltrichlorosilane in heptane | air 25° C., ~2 h | 40.9 | 2.7 |
| none | untreated | 56.3 | 2.7 |

TABLE 9

Angle of repose measurements for magnesium powders treated with various reagents.

| Sample description | | Angle of Repose (degrees) | 95% confidence level (degrees) |
|---|---|---|---|
| Mg, −325 mesh, lot K03J26 | | | |
| Reagent | Comments | | |
| none | untreated | 51.7 | 1.3 |
| tert-butyl(chloro)dimethylsilane | 0.5 M in heptane, vac 110° C., ~20 min | 49.7 | 1.4 |
| methyltrichlorosilane | 0.5M in heptane, vac 110° C., ~20 min | 53.0 | 2.0 |
| methyltrichlorosilane | 0.5M in heptane, vac 110° C., ~20 min, stored 4 months | 35.8 | 3.7 |
| Mg, −325 mesh, lot F20N13 | | | |
| untreated | untreated | 48.9 | n/a |
| iso-butyltrichlorosilane | 0.5M in heptane, vac 120° C., ~1 h | 34.1 | 1.2 |
| n-octadecyltrichlorosilane | 0.5M in heptane, vac 120° C., ~1 h | 51.5 | 2.4 |
| methyltrichlorosilane | 0.01M in heptane, no wash, vac 120° C., 2 h | 35.5 | 1.6 |
| iso-butyltrichlorosilane | 0.01M in heptane, no wash, vac 120° C., 2 h | 30.6 | 4.0 |
| n-propyltrichlorosilane | 0.01M in heptane, no wash, vac 120° C., 2 h | 34.2 | 2.4 |

With reference to Table 9 the effect of other short-chain alkyl substituents on flowability is shown.

Unlike the treated aluminum powders that are relatively insensitive to drying conditions, the angle of repose of treated magnesium powder and treated magnesium-aluminum alloy powders is sensitive to the drying process, as can be seen by comparing the different heating conditions in Table 7 for the 50% magnesium-50% aluminum alloy powder and in Table 10 for the magnesium powder. In other experiments, the silane treated metal powders were heated under vacuum for various times in the temperature range of 110° C.-150° C. Trichlorosilanes with short attached alkyl groups reduced the angle of repose (with exceptions attributed to insufficient heating). However, the angle of repose was not reduced by treatment of Al-50% Mg powder with the monochlorosilane chlorotrimethylsilane (angle of repose 50.4°±1.6°). Neither was the angle of repose reduced by treatment of Mg powder with the long-chain alkylsilane octadecyltrichlorosilane (angle of repose 51.5°±2.4°).

TABLE 10

Angle of repose measurements for silane-treated magnesium powder, subjected to various drying conditions.

| Sample description | Angle of Repose (degrees) | 95% confidence level (degrees) |
|---|---|---|
| Mg. −325 mesh, lot D23M05 treated with tert-butyltrichlorosilane, 0.1M in anhydrous hexane | | |
| vac 25° C., 1 h | 40.0 | 2.1 |
| vac 25° C., 13 h | 39.1 | 2.8 |
| vac 25° C., 19 h | 38.1 | 2.3 |
| vac 25° C., 19 h; vac 120° C., 1 h | 35.6 | 2.7 |
| Mg. −325 mesh, lot D23M05 treated with methyltrichlorosilane, 0.1M in anhydrous hexane | | |
| vac 25° C., 1 h | 53.5 | 1.7 |
| vac 25° C., 5 h | 53.1 | 1.3 |
| vac 25° C., 17 h | 49.0 | 3.0 |
| vac 25° C., 23 h | 41.6 | 2.6 |
| vac 25° C., 23 h; vac 120° C., 1 h | 36.3 | 4.0 |

With reference to Table 11 the effect of reducing the concentration of silane in solution on flowability is shown.

TABLE 11

Angle of repose measurements for magnesium powder treated with different amounts of silane.

| Sample description | Angle of Repose (degrees) | 95% confidence level (degrees) |
|---|---|---|
| Mg, −325 mesh, lot D23M05 treated with tert-butyltrichlorosilane in anhydrous hexane, vac 2 h, 120° C. | | |
| untreated | 47.2 | 3.1 |
| anhydrous hexane only | 46.9 | 2.7 |
| 0.001M silane | 42.4 | 1.8 |
| 0.01M silane | 43.1 | 3.2 |
| 0.1M silane | 38.1 | 1.8 |
| 1.0M silane | 37.7 | 1.9 |

For scale-up to 2.4 kg batches of magnesium powder, both methyltrichlorosilane and iso-butylchlorosilane were used at a concentration of 0.02 M in anhydrous heptane, with drying for six hours under vacuum in a temperature range of 110° C.-150° C., and sieving the final product to −325 mesh according to Method VI. The silane treated −325 mesh Mg powder exhibited much better flow characteristics than did the untreated −325 mesh Mg powder. While the reduction in the angle of repose achieved is similar between the methyltrichlorosilane and iso-butylchlorosilane reagents, the iso-butylchlorosilane solution formed a more fluid suspension that was easier to transfer from the 10-L beaker to the 4-L medium-frit filter, and so offers a small advantage for further scale-up.

A variety of organic solvents were used in the silane treatment experiments, including pentane, hexane, hexanes, heptane, toluene, dichloromethane, and acetone. The acetone solutions of alkyltrichlorosilanes appeared chemically unstable, but were still effective at reducing the angle of repose of Mg and Al—Mg powders. Other solvents that do not react excessively with the silane reagent may be used.

In addition to the data tabulated in Tables 1-11 and shown in FIGS. 1-6, we report that silane treatment is also effective with titanium metal powder, reducing the angle of repose from 53.4°±2.6° (untreated) to 34.7°±3.2° (treated with 0.5 M methyltrichlorosilane solution). Also, enhanced flow behavior was observed for powder mixtures of aluminum and metal oxides after silane treatment.

The possible deterioration of powder flow behavior under high humidity was also examined. Clumping was so severe in the case of untreated H-10 Al (lot 01-2149) exposed to 88% relative humidity for one month, that an angle of repose measurement could not be made. In contrast, a sample of H-10 Al (lot 01-2149), treated with methyltrichlorosilane and stored under 88% humidity for one month showed no clumping or loss of flowability (angle of repose 31.4°±3.7°). A preliminary experiment comparing the angle of repose of tert-butyltrichlorosilane treated Mg powder before (average angle of repose 33.6°±2.3°) and after (average angle of repose 35.1°±2.0°) overnight exposure to 88% relative humidity shows that the flow characteristics are stable to brief exposures to high humidity. Moisture in the solvent or physisorbed water on the metal powders was not specifically controlled in these experiments, although it is known to affect silane coverage on glass [McGovern, M. E.; Kallury, K. M. R.; Thompson, M. "Role of Solvent on the Silanization of Glass with Octadecyltrichlorosilane" *Langmuir* 1994, 10, 3607-3614]. Consistent with the enhanced stability to moisture, the treated powders were hydrophobic and could only be suspended in water with the aid of a surfactant.

An important aspect of the enhanced flowability of the treated metal powders is a substantial increase in both pour density and packing density.

Figure 8:
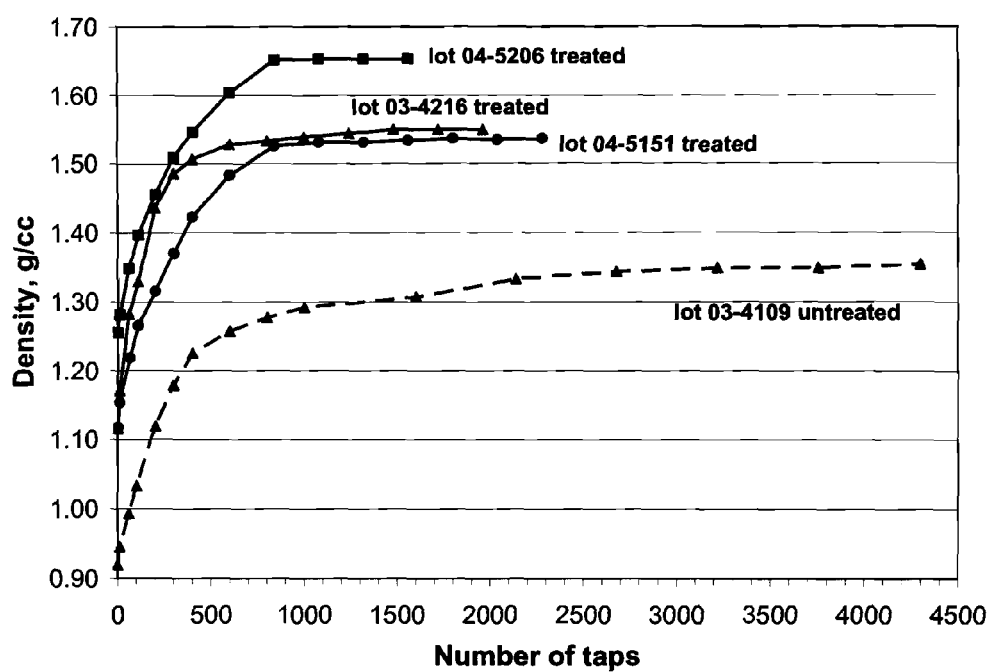
FIG. 8 of the drawings is a plot of tap density versus number of taps, comparing silane treated H-5 aluminum samples from three different commercial lots with an H-5 sample that was not treated, according to embodiments of the invention.

FIG. 8 shows tap density results for methyltrichlorosilane treated H-5 aluminum powders.

The three treated powders exhibit about a 20% increase in both pour density and tap density compared to an untreated powder. The density increases are consistent with the notion of reduced interparticle forces resulting from surface modification by the methyltrichlorosilane reagent. The treated particles can more readily rearrange to give a densely packed material.

Figure 1:
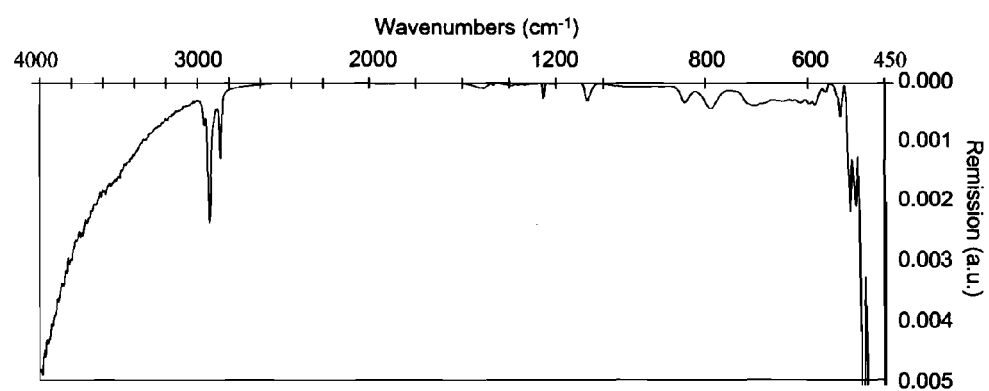
FIG. 1 of the drawings is a diffuse reflectance FTIR spectrograph of H-10 Al powder, lot 01-2149, treated with n-octadecyldimethylchlorosilane in heptane, according to embodiments of the invention.

It will be apparent to one of ordinary skill in the art of the present invention that many similar surface modifying reagents in addition to those identified in FIG. 1 are known and are within the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A metal powder, comprising:
   a powder having untreated metal particles, wherein said metal particles comprises a reactive metal, wherein said metal particles comprises at least one of aluminum, magnesium, aluminum-magnesium alloy, titanium, and any combination thereof;
   said powder mixed together with a solvent and an alkylchlorosilane or alkylalkoxysilane to form a slurry;
   said metal particles react with the alkylchlorosilane or alkylalkoxysilane to form a reaction mixture having treated metal particles;
   said treated metal particles being separated from the reaction mixture; and
   said treated metal particles being subjected to a selected temperature profile to form a treated metal powder having a surface layer of general composition $O_nRSiX_{3-2n}$, where R=alkyl, X=chloro or alkoxy, and n is in the range of 0.5-1.25.

2. The powder according to claim 1, further comprising:
   wherein each said untreated particle having hydroxyl groups linked to its surface being a first composition; and
   said linked hydroxyl groups of said first composition react with the alkylchlorosilane or alkylalkoxysilane to form a second composition each having a silane moiety linked to its surface.

3. The powder according to claim 1, wherein the alkylchlorosilane(s) comprising at least one of methyltrichlorosilane, (3,3,3-trifluoropropyl)dichloromethylsilane, dichlorodimethylsilane, tert-butyltrichlorosilane, isobutyltrichlorosilane, propyltrichlorosilane, trichloro(3,3,3-trifluoropropyl)silane, oligomerized diallyldichlorosilane, and oligomerized dichloro di(perfluoroalkyl) silane, and any combination thereof.

4. The powder according to claim 1, further comprising:
   said first powder having untreated metal particles, said first powder exhibiting a first packing density;
   said first powder wetted with a solvent and an alkylchlorosilane to form a first mixture;
   said first mixture being stirred to allow contact of the metal particles and the alkylchlorosilane to form a second mixture having treated metal particles;
   said treated metal particles being removed from the second mixture; and
   said treated metal particles being subjected to a selected temperature profile to form a second powder, said second powder exhibiting a second packing density higher than said first packing density.

5. The powder according to claim 4, further comprising:
   said first powder having untreated metal particles, said first powder exhibiting a first pour density; and
   said treated metal particles being subjected to a selected temperature profile to form a second powder, said second powder exhibiting a second pour density higher than said first pour density.

6. The powder according to claim 1, further comprising:
   said first powder having untreated metal particles, said first powder exhibiting a first fluidizability behavior; and
   said treated metal particles being subjected to a selected temperature profile to form a second powder, said second powder exhibiting enhanced fluidizability compared to said first powder.

7. A metal powder, comprising:
   a first powder having metal particles, said first powder exhibiting a first angle of repose, wherein said metal particles comprises a reactive metal, wherein said metal particles comprises at least one of aluminum, magnesium, aluminum-magnesium alloy, titanium, and any combination thereof;
   said first powder wetted with a solvent and alkylchlorosilane or alkylalkoxysilane to form a first mixture;
   said first mixture stirred to contact the metal particles and the alkylchlorosilane or alkylalkoxysilane to form a second mixture having treated metal particles;
   said treated metal particles being removed from the second mixture; and
   said treated metal particles being subjected to a selected temperature profile to form a second powder, said second powder exhibiting a second angle of repose less than said first angle of repose, said metal powder having a surface layer of general composition $O_nRSiX_{3-2n}$, where R=alkyl, X=chloro or alkoxy, and n is in the range of 0.5-1.25.

8. The powder according to claim 7, wherein said second angle of repose is less than about 30°.

9. The powder according to claim 7, wherein said second angle of repose is less than about 35°.

10. The powder according to claim 7, wherein said second angle of repose is less than about 40°.

11. A metal powder, comprising:
    a powder having metal particles, wherein said metal particles comprises a reactive metal, wherein said metal particles comprises at least one of aluminum, magnesium, aluminum-magnesium alloy, titanium, and any combination thereof;
    said powder mixed together with a solvent and at least one of methyltrichlorosilane, ethyltrichlorosilane, tert-butyltrichlorosilane, iso-butyltrichlorosilane, and any combination thereof to form a slurry;
    said metal particles react with said methyltrichlorosilane, ethyltrichlorosilane, tert-butyltrichlorosilane, iso-butyltrichlorosilane and any combination thereof to form a reaction mixture having treated metal particles;
    said treated metal particles being separated from the reaction mixture; and
    said treated metal particles being subjected to a selected temperature profile to form a treated metal powder having a surface layer of general composition $O_nRSiX_{3-2n}$, where R=methyl, ethyl, tert-butyl, iso-butyl, and any combination thereof, X=chloro, and n is in the range of 0.5-1.25.

12. The powder according to claim 7, or 11, wherein the solvent comprises at least one of pentane, hexane, and heptane.

13. A metal powder, comprising:
    a powder having metal particles, wherein said metal particles comprises a reactive metal, wherein said metal particles comprises at least one of aluminum, magnesium, aluminum-magnesium alloy, titanium, and any combination thereof;
    said powder being exposed to a gas having an alkylchlorosilane vapor or alkylalkoxysilane vapor;
    said metal particles react with the alkylchlorosilane vapor or alkylalkoxysilane vapor to form treated metal particles;
    said treated metal particles being separated from the alkylchlorosilane vapor or alkylalkoxysilane vapor, and
    said treated metal particles being separated from the alkylchlorosilane vapor or alkylalkoxysilane vapor to form a treated metal powder having a surface layer of general composition $O_nRSiX_{3-2n}$, where R=alkyl, X=chloro or alkoxy, and n is in the range of 0.5-1.25.

14. A metal powder, comprising:
a powder having metal particles;
said powder mixed together with a solvent and an alkylchlorosilane to form a first slurry;
said metal particles react with the alkylchlorosilane to form a reaction mixture having primary treated metal particles;
said primary treated metal particles being separated from the reaction mixture;
said primary treated metal particles mixed together with a solvent and hexamethyldisilazane (HMDS) to form a second slurry; and
said primary treated metal particles of said second slurry react with hexamethyldisilazane (HMDS) to form a reaction mixture having secondary treated metal particles.

15. The powder according to claim 14, further comprising said primary or secondary treated metal particles being subjected to a selected temperature profile to form a treated metal powder.

16. The powder according to claim 14, wherein said metal powder having particles of at least one of aluminum, magnesium, aluminum-magnesium alloy, titanium, and any combination thereof, and wherein said solvent includes at least toluene.

* * * * *